UNITED STATES PATENT OFFICE.

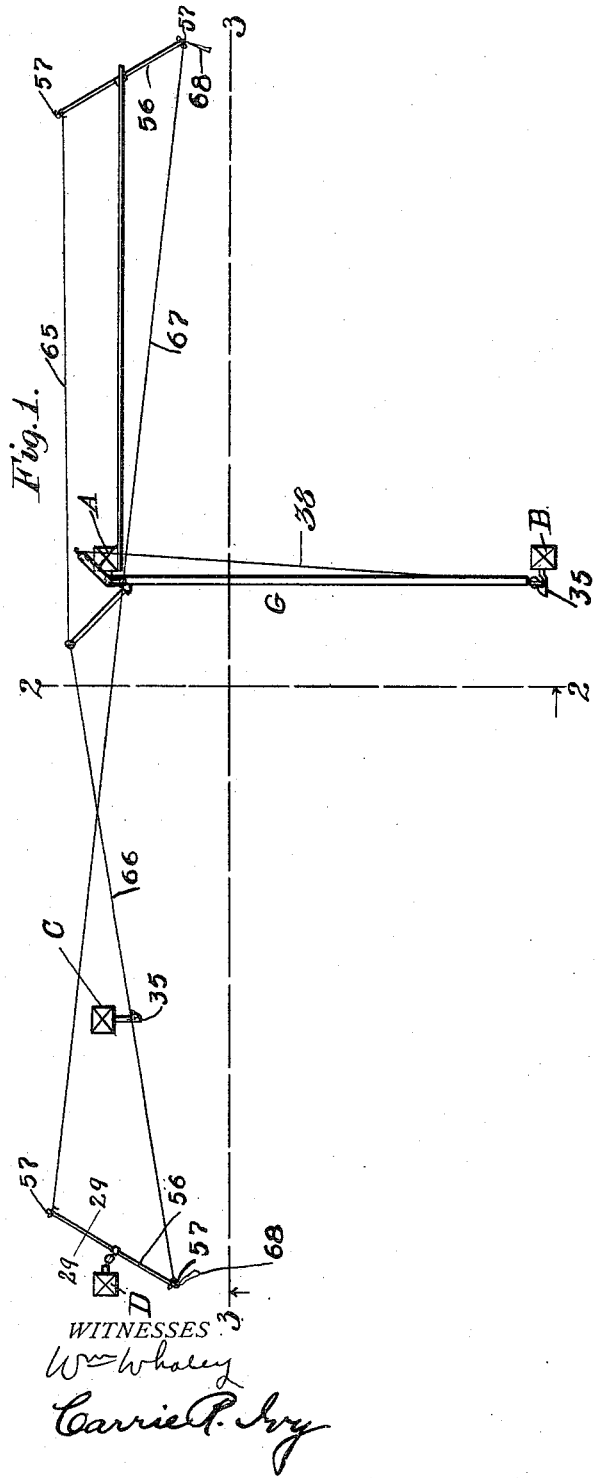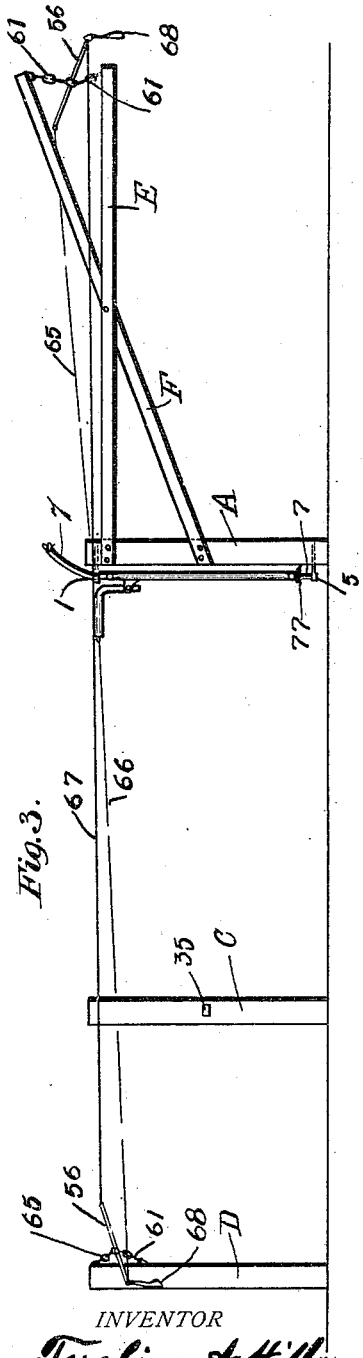

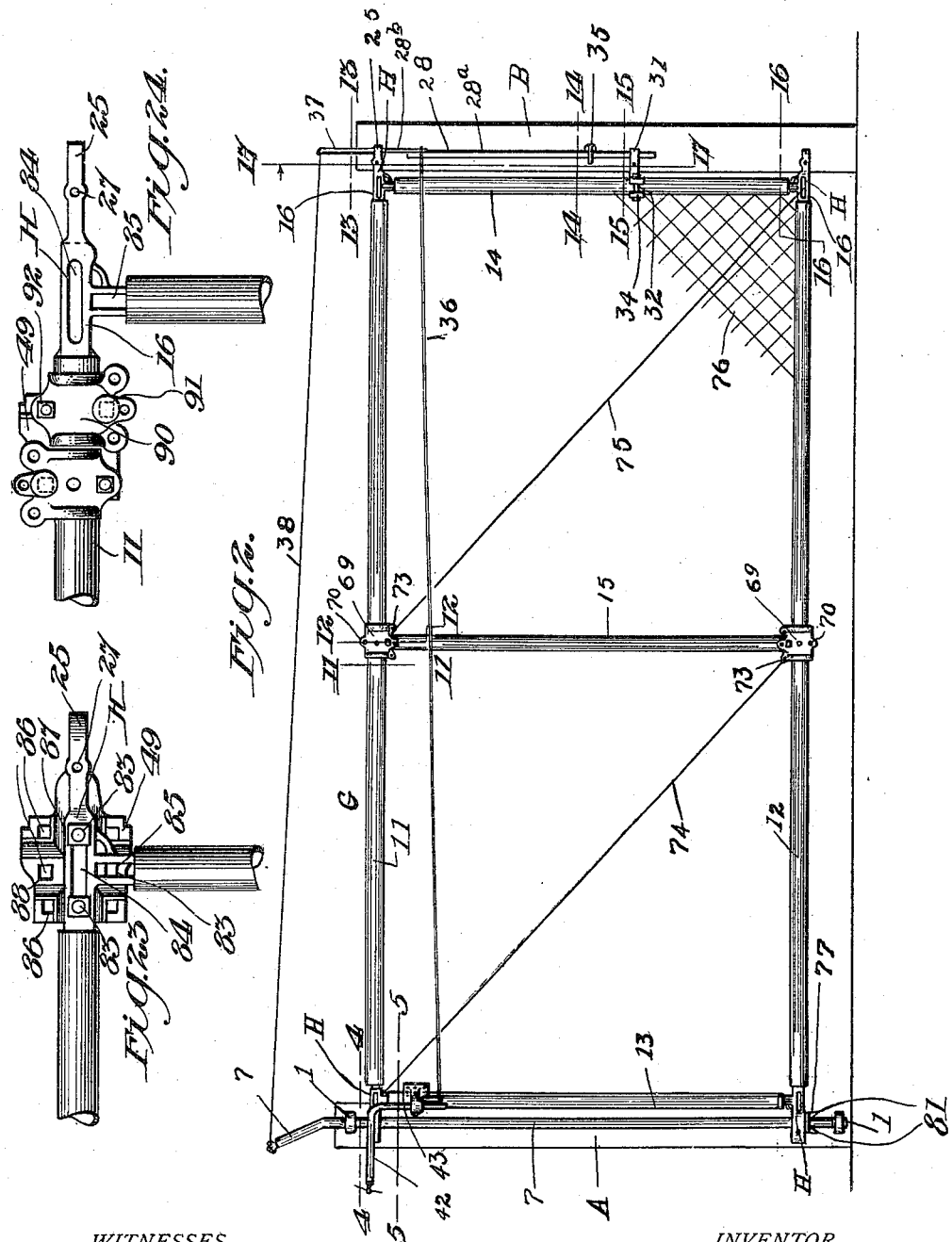

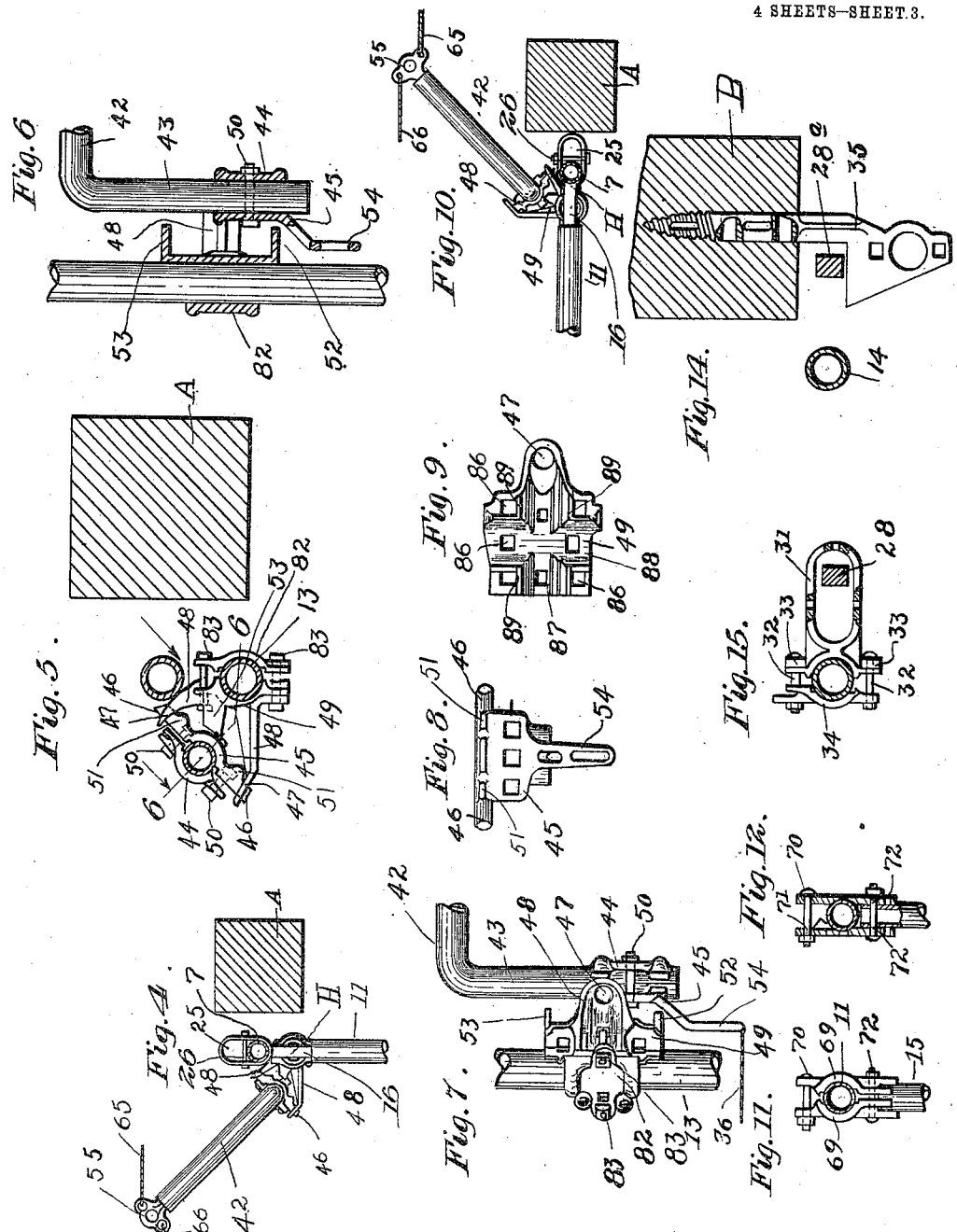

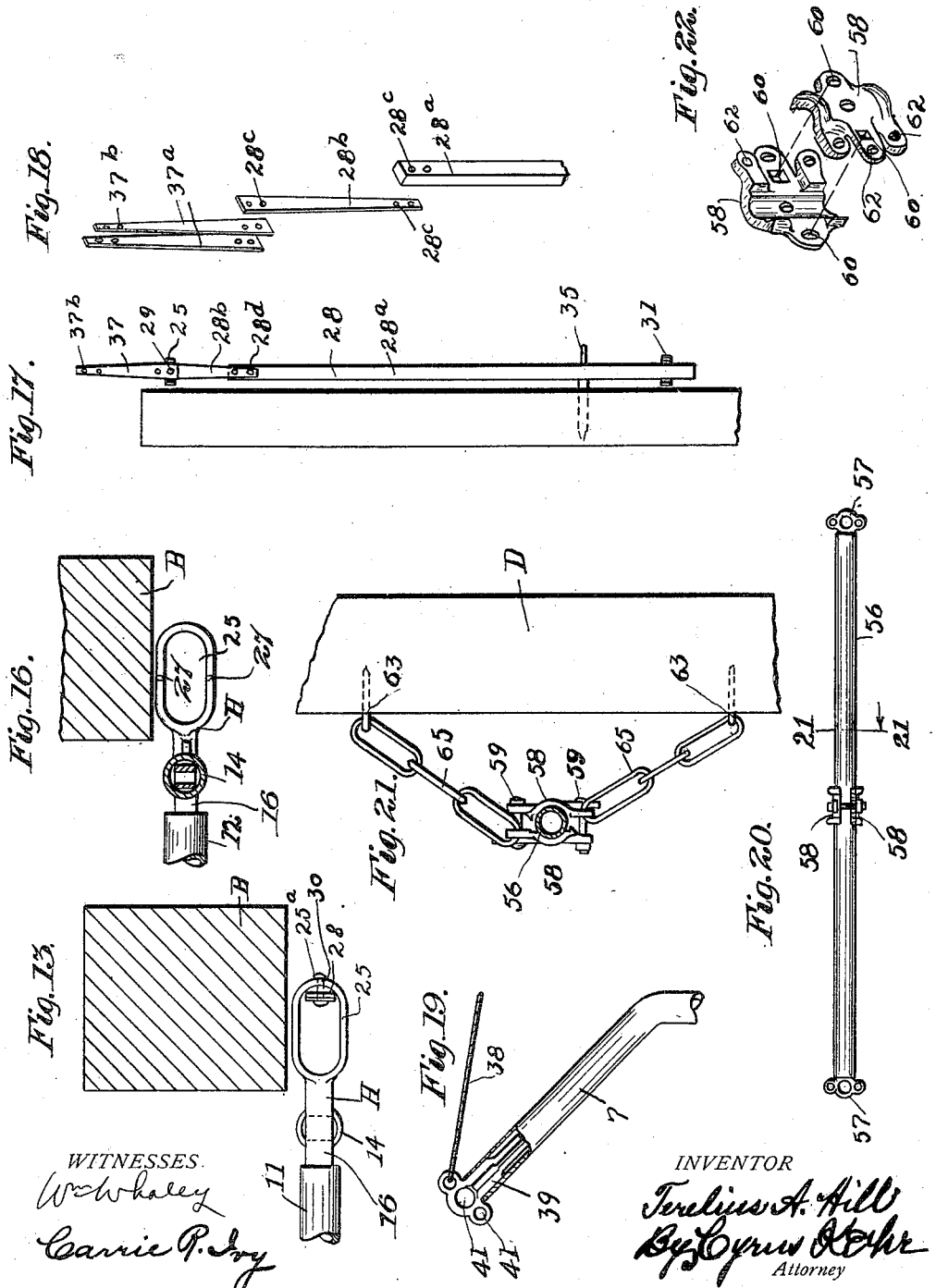

TERELIUS A. HILL, OF MARYVILLE, TENNESSEE.

GATE.

983,229.

Specification of Letters Patent.

Patented Jan. 31, 1911.

Application filed March 9, 1910. Serial No. 548,146.

*To all whom it may concern:*

Be it known that I, TERELIUS A. HILL, a citizen of the United States, residing at Maryville, in the county of Blount and State of Tennessee, have invented a new and useful Improvement in Gates, of which the following is a specification, reference being had to the accompanying drawing.

My improvement relates to gates which extend across roadways or entrances to buildings or other similar passages.

The invention has reference particularly to gates which are supported at one end upon an upright hinge.

The object of the invention is to produce an efficient gate of this type which may be cheaply made and which will operate in a simple manner. In seeking to attain such object, I have devised, as one form of my apparatus, a construction composed of a few wires, sections of ordinary wrought iron pipe, ordinary bolts, and castings adapted to fit into several positions in the structure, thus effecting a duplication of castings which will reduce the number of kinds of castings, so that merely the castings may be shipped from a factory to local users, the wire, piping, and bolts being bought in the local market; and I have further sought to form the hinge members and other parts so as to provide for the application of the gate proper to its support in a variety of ways.

In the accompanying drawings, Figure 1 is a plan of a gate embodying my improvement; Fig. 2 is a section on the line 2—2 of Fig. 1, looking toward the right; Fig. 3 is an upright section on the line 3—3 of Fig. 1, looking in the direction of the arrow; Fig. 4 is a sectional plan on the line 4—4 of Fig. 2; Fig. 5 is a sectional plan on the line 5—5 of Fig. 2; Fig. 6 is a section on the line 6—6 of Fig. 5, looking in the direction of the arrow; Fig. 7 is an elevation of the mechanism shown by Fig. 5, looking in the direction of the arrows: Figs. 8 and 9 are detail views of two of the castings shown assembled in Fig. 7; Fig. 10 is a view like Fig. 4, the parts being in the position assumed when the gate is open; Fig. 11 is a section on the line 11—11 of Fig. 2, looking toward the right; Fig. 12 is a section on the line 12—12 of Fig. 2, looking toward the right; Fig. 13 is a sectional plan on the line 13—13 of Fig. 2; Fig. 14 is a horizontal section on the line 14—14 of Fig. 2; Fig. 15 is a horizontal section on the line 15—15 of Fig. 2; Fig. 16 is a sectional plan on the line 16—16 of Fig. 2; Fig. 17 is an upright section on the line 17—17 of Fig. 2, looking toward the right; Fig. 18 is a perspective view of the parts of the latch tongue and flexible standard separated from each other in position to be assembled; Fig. 19 is a sectional detail of the upper end of the pintle shaft; Fig. 20 is a detail plan of the suspended arm shown in the left hand portion of Figs. 1 and 2; Fig. 21 is an upright section on the line 21—21 of Figs. 1 and 20; Fig. 22 is a perspective view showing the two clamping plates of Figs. 20 and 21 separated and indicating how they are to be joined by bolts; Fig. 23 is a rear sectional elevation showing the stationary clamp member secured directly to the upper inner corner piece; Fig. 24 is a similar elevation showing the clamp member applied to the upper frame member.

Referring to said drawings, A is a hinge post. To this the gate proper, G, is hinged on an upright axis.

B is a latch post bearing a latch member for securing the outer end of the gate in the closed position.

C is an abutment post against which the outer or free end of the gate abuts when it is open.

D is a post for supporting one of the suspended levers.

E is an arm secured by one end to the hinge post, A, and extending approximately horizontally rearward.

F is a brace extending from the hinge post rearward and obliquely upward across the arm, E, so as to leave a space between the free ends of said brace and arm. Where said brace and arm cross, they are secured to each other in any desired manner.

For convenience in description, the side of the gate which is at the front in Fig. 2 will be herein treated as the front of the gate while the end of the gate at the hinge is termed the inner or hinge end and the opposite end is termed the outer or free end. A hinge member, 1, extends into the upper portion of one side of the hinge post, A, and has an upright eye, 2, through which extends a pintle shaft, 7, which is another hinge member. Near the lower end of the post, A, another hinge member, 1, is secured to the post and receives the pintle shaft. By any desired means said pintle shaft is held firmly against rotation and also against up or down movement in said members 1. The upper end of the pintle shaft extends above the upper hinge member, 1, and is directed rearward in a line approximately bisecting the angle formed by a line extending from said shaft to the latch post, B, and from said shaft to the suspended lever post, D, so that the distance from the free end of said shaft to the free end of the gate when the latter is fully open or fully closed is less than when the gate is midway between the open and the closed positions. This difference in distance is utilized to facilitate the automatic movement of the gate from its middle position to either the closed or the open position, as will be hereinafter described.

The gate proper, G, is shown in the form of metal framework comprising an upper horizontal, metal frame-pipe, 11, and a lower frame-pipe, 12, both nearly as long as the gate, and an upright inner end frame-pipe, 13, and a similar outer end frame-pipe, 14, and a similar middle frame-pipe, 15. At all the corners of the gate, in the form shown in the drawings, the adjacent ends of the frame-pipes are joined by a gate corner piece, H, which is identically the same in construction at all of the four corners (see Fig. 2).

A description of the corner piece at the lower left hand corner of the gate, by reference to Figs. 2, 4, 10, 13, 23 and 24, will answer as a description for all of said corner pieces. Said corner piece has a horizontal arm, 16, entering the lower frame-pipe, 12, and fitting closely therein. Said corner piece has a similar upright arm, 20, fitting closely into the adjacent frame pipe 14.

Horizontally in line with the arm, 16, and extending away from said pipes is an extension forming an upright eye, 25, through which extends the pintle shaft, 7. In the form shown in the drawings, said eye is elongated in line with the arm, 16, so that the pintle shaft may rest at either side of a bolt, 26, resting in bolt holes, 27, extending transversely through the walls of said eye (Figs. 4, 10, 16, 23, and 24). In other words, in horizontal cross section, the length of said eye is a little more than twice its width horizontally. This construction makes it possible to bring the gate nearer to or farther from the pintle shaft, both at the lower corner and at the upper corner (where a similar corner piece is used) or either of said corners may thus be moved toward or from the pintle shaft. In this manner, the outer end of the gate may be raised or lowered, if the pintle shaft should not be upright, either through inaccurate setting on the post, A, or through subsequent leaning of the post. The upper inner corner piece, H, is applied to the pipes precisely as is the lower one, excepting that the upright arm is directed downward instead of upward. The pintle shaft extends through the eye, 25, of said corner piece just as it extends through the eye, 25, of the corner piece already described.

At the outer upper and lower corners (the right hand in Fig. 2) of the gate, the eye, 25, of the corner piece projects far enough to abut against the latch post, B, when the gate is closed, thus forming stops for said corners of the gate. And said upper eye also serves as a support for the latch tongue, 28, a bolt, 29, extending through the upper end of said tongue and a horizontal hole, 25ª, in the outer end of said eye. At its lower end said tongue is confined in an elongated eye, 31, which is secured to the outer gate frame pipe, 14, by means of clamp bolts, 32, extending horizontally through ears, 33, and through the clamp plate, 34, located at the opposite side of said frame pipe. (See Figs. 2 and 15.) Said tongue is flexible, and being thus secured, its lower end is free to be moved a short distance from the adjacent frame pipe, 14. A latch hook, 35, projects outward horizontally from the latch post, B, to receive said tongue when the gate is closed and said tongue moved outward away from said frame pipe and so as to leave a clear way for said tongue to move away from said post (with the gate) when said bar has been drawn toward said frame pipe. (See Figs. 2, 14, and 17.) In the particular form shown in the drawings, said latch tongue is composed of two pieces, to-wit: a bar, 28ª, and a spring blade, 28ᵇ. Said blade has converging side edges, so that one end is wider than is the outer end, and at each end it has two bolt holes, 28ᶜ, which are in line with the length of said blade and spaced equi-distant from each other. In the upper end of the bar, 28ª, are two similar bolt holes, 28ᶜ, spaced equally far from each other. Either end of the blade, 28ᵇ, may be placed upward, according to the resiliency desired. And the bolt, 29, may be placed through either upper hole, 28ᶜ, according to the resiliency desired. The lower end of said blade and the upper end of said bar are made to overlap, the bolt holes being placed opposite each other, and bolts, 28ᵈ, are extended through said holes to bind said blade and bar together. One of said bolts may be an eye bolt to receive one end of the latch tension member, 36. Said blade is under strain normally pressing the bar, 28, away from the adjacent frame pipe, and the parts are preferably so proportioned as to bring the bar against the outer wall of the eye, 31, when said tongue is out far enough for engagement with the latch hook, whereby said tongue is stopped from further outward movement. And a resilient standard, 37, rises from said eye, 25, of the upper outer corner piece, H. In the form shown in the drawings, said standard consists of two spring blades, 37ª, tapering like the blade, 28ᵇ, and having bolt holes, 37ᵇ, spaced like the holes, 28ᶜ, in the blade, 28ᵇ. The bolt, 29, extends through the lower ends of the blades, 37ª, as well as through the blade, 28ᵇ, and the hole, 30, in the eye, 25, said bolt serving to secure the three blades immovably to said eye. The blades, 37ª, may have either end placed lowermost and the bolt, 29, may extend through either of the bolt holes in such lower end, according to the degree of resiliency desired. And only one or a number larger than two of said blades, 37ª, may be used to form such standard, according to the desired resiliency or strength. To the upper end of said resilient standard is attached a tension member, 38, such attachment being made in either of the upper holes, 37ᵇ, according to the degree of resiliency or strength desired. The uses of said tension member, 38, will be hereinafter described.

Into the upper end of the pintle shaft, 7, is driven the shank, 39, of an eye piece, 40, having three eyes, 41. Said shank has an outer thin portion or section and an inner thick portion or section, each being polygonal in cross section, as described of the corner pieces, H, so that said shank is adapted to enter pipes of either of two sizes, as described in connection with the corner pieces, H. (See Figs. 2, 4, and 19.) The tension member, 38, is secured by one end in the eye piece on said pintle shaft and by its other end to the resilient standard, 37, as above described. Said tension member is short enough to be under strain when the gate is closed. The functions of the tension member, 38, are (1) drawing the gate into the closed or into the open position after it has passed one way or the other beyond the middle of the arc through which it swings, and (2) holding the gate against rebounding when it strikes the latch post or the stop post and against moving by the action of the wind, should the latch accidentally fail to operate.

It has already been described how the upper end of the pintle shaft is bent or extended laterally so as to make the distance between the extreme upper portion of said shaft and the upper portion of the latch bar less when the gate is closed (against the latch post, B) or when it is fully open (against the abutment post, C) than when the gate is midway between said two positions (see Fig. 1). This places the tension member, 38, directly into the plane of the gate when the latter is in such middle position, but places said member outside of said plane (at the side thereof toward the nearer post, B or C) when the gate is moved out of said middle position, so that then said tension member tends to draw the gate toward said post, and does so if the gate is free to swing on its hinge. For the attachment of other tension members to which power is to be applied for the swinging of the gate from the closed to the open position, and vice versa, a gate arm, 42, projects from the front of the upper inner corner horizontally through the plane of the hinge post, A, and the abutment post, C. Said arm stands at an angle of about 45 degrees to the plane of the gate and is integral with an upright shaft, 43, which is clamped between the front clamp member, 44, and the rear clamp member, 45, the latter member being hinged on a horizontal axis by journals, 46, on the upper portion of said member, in bearings, 47, formed in ears, 48, on a stationary clamp member, 49, secured to the gate as hereinafter described. The axial line of said journals, 46, is horizontal and approximately midway between the two sides of the angle formed by a line extending from the latch post to the hinge post and from the hinge post to the abutment post—in the plane of the upper end of the pintle shaft, which plane is perpendicular to the upright plane of the gate arm, 42. Although the free end of the gate arm extends through the upright plane extending from the hinge post to the abutment post, it has a clear space permitting movement through ninety degrees, without engaging the hinge post, when the gate is opened and closed. Said front clamp member, 44, is identical in form with the clamp plate, 34, located, as already described, on the outer frame pipe, 14. Bolts, 50, extend through said plates, 44 and 45, at each side of the shaft, 43, and bind said plates firmly to said shaft, so that the latter may move only as said clamp members move. The ears, 48, diverge from each other from the rear forward, so that the bearings, 47, are diagonal to said journals and nearer to each other when measured at the rear of said journals than when measured at the front of said journals. On the rear of the rear clamp member, 45, adjacent each journal, 46, is a lug, 51, which prevents movement of said clamp member parallel to said journals, either to the right or left (see Figs. 4 to 8, inclusive). When said clamp member, 45, is partially rotated in the horizontal position, said lugs are opposite portions of said bearings which are separated so much farther than the outer faces of said lugs as to permit sidewise movement in either direction to let one of the journals slip out of its bearing, after which said member may be turned sidewise, the bearings being large enough to permit the journals to slant therein, and then said member may be shifted bodily sidewise in the opposite direction for the withdrawal of the second journal from its bearing. Opposite the lower portion of the body of said rear clamp member, 45, a stop lug, 52, extends forward from the stationary clamp member, 49. Said stop limits the rearward oscillation of the clamp member, 45. On the upper portion of the stationary clamp member, 49, is a similar forward-directed stop lug, 53, which limits the rearward oscillation of the portion of the gate arm shaft, 43, which is above the two clamp members, 44 and 45. The length of the stop lugs, 52 and 53, is such as to allow only a slight rocking of said gate arm shaft and the two clamp members by which said shaft is held—only enough to give such movement to the downward extension, 54, on the rear clamp member, 45, as will pull the latch tension member, 36, far enough to draw the lower portion of the latch bar, 28, out of engagement with the latch hook, 35, said tension member being secured by one end to said downward extension, 54, and by its other end to the latch tongue as above described. Then tension member, 36, normally holds the rear clamp member, 45, against the lower stop lug, 52, so that the gate arm shaft, 43, is ready to tilt for carrying its upper portion and the gate arm backward. The transmission of power by such slight oscillation of the gate arm, 42, gate arm shaft, 43, and the clamp members, 44 and 45, by which said shaft is held, is one of the two functions of said arm, shaft, and clamp members. The other of said two functions is the transmission of power to the gate for opening it after the latch bar has been released. The outer or free end of the gate arm, 42, is at the side of the gate hinge opposite the body of the gate, so that said arm becomes the short arm of a lever of which the body of the gate is the long arm; and by applying power to the free end of said short arm to move it horizontally in one direction, said arm and the body of the gate turn horizontally in unison, with the pintle shaft axis as a pivotal or axial line, and it will be observed that, if power is applied to said arm, 42, in the direction indicated, said arm and its shaft, 43, and the clamp members, 45 and 46, will together turn upon the journals, 46, until said shaft abuts against the stop lug, 53, before strain is put upon the gate for the turning of the latter upon its hinge. And such tilting affords the necessary movement of the downward extension, 54, to effect the release of the latch bar from the latch hook. Hence the one application of power to the free or outer end of the gate arm (as by pulling on a cord or wire attached to said arm) leads to the performance of the two above mentioned functions in proper sequence. The means for applying power to said gate arm will be hereinafter described.

A latch hook, 35, is placed on the abutment post, C, in proper position to receive the latch tongue, 28, when the gate is open. And when the gate is open and thus secured to said latch hook, applying power to the outer end of said gate arm in the forward direction will again tilt said arm shaft and said clamp members, 44 and 45, to cause the downward extension, 54, to again shift the latch tongue in the same manner as for the opening of the gate, and the continued movement of said arm will then cause the swinging of the gate into the closed position. The gate arm, 42, and the shaft, 43, may be a continuous pipe with an eye piece, 55, like the eye piece, 40, secured to the outer end of said arm by driving the shank of said eye piece into the end of said arm.

Between the outer ends of the arm, E, and brace, F, and at the upper end of the suspended lever post, D, is a suspended rocking lever, 56. In the form shown in the drawings, said levers are identical in form and each is composed of a piece of ordinary stock metal pipe, and each has an eye piece, 57, similar to the eye pieces, 40 and 55, applied to its ends by driving the shanks thereof into said ends. And to the middle of each of said levers is applied a pair of clamp plates, 58, like the clamp plate, 34, already described as being applied to the outer frame pipe, 14. But the like ends of said plates are placed diagonally opposite each other and bolts, 59, pass through holes, 60, in said plates at each side of the lever. (For details of these plates, see Fig. 22.) By means of links, 61, one of said levers is suspended between the free ends of the arm, E, and the brace, F, said links being secured to said arm and brace and in one of the eyes, 62, of the clamp plates, 58. At each side of the lever, the links may be secured in any one of the three clamp plate eyes, 62, as will best serve to balance said lever. The links should be a little slack or else the arm, E, and brace, F, should be sufficiently flexible to allow the links to become slack under moderate strain. Being thus suspended, this lever is adapted to universal movement—a universal rocking or tilting and a short bodily movement in every direction. Such bodily movement, to a limited extent, toward and from the other lever, 56, is desirable to give the levers freedom in turning.

To the upper end of the lever post are applied two eye bolts, 63, one being located above the other and their eyes, 64, being directed toward the hinge post, A. Links, 65, are applied to said eyes and to the eyes of the clamp plates, 58, of the adjacent suspended lever, 56, in the same manner as the links, 61, are applied to the lever, 56, at the free ends of the arm, E, and brace, F. Thus provision is made for a universal tilting and bodily movement of this second lever, 56. From the eye piece, 57, at one end of one of said suspended levers, a tension member, 65, extends to the eye piece, 55, on the arm, 42. And from said eye piece, 55, another tension member, 66, extends to the diagonally opposite eye piece, 57, of the other lever, 56. And the other eye pieces, 57, of said levers are joined to each other by a long tension member, 67. And a suspended hand member, 68, is applied to each eye piece, 57, on the end of each of said levers, 56, toward the gate or drive-way, said suspended member hanging low enough to be grasped by a person walking or riding. The distance between the lever post, D, and the abutment post, C, and the distance between the free ends of the arm, E, and brace, F, and the hinge post, A, should be longer than the length of a team or a vehicle.

The tension members leading from the rocking levers, 56, are shown crossed, so that for the opening of the gate, either suspended hand member, 68, is to be pulled toward the gate, while for the closing of the gate, either hand member is pulled in the opposite direction. And it is to be here observed that the movement of the suspended levers is, on account of their peculiar suspension, ample for swinging the gate from the closed to the open position, and vice versa, quite independently of the action of the tension member, 38, and the flexible standard, 37. The action of such suspended levers does not, as is the case in all other gates of this type, so far as I know them, cease after the gate has been unlatched and moved through the beginning portion of its course, momentum being relied upon to carry the gate beyond the middle portion of its course—the dead center of action of the tension member, 38, upon the outer end of the gate. On the contrary, the action of my suspended levers, 56, may continue uninterruptedly while the gate moves from one position of rest to the other; and the tension member, 38, might be altogether omitted, were it not desirable to utilize its functions of holding the gate in the positions of rest when the latches accidentally fail to work, and to hold the gate against rebounding when the outer end thereof strikes the latch post or the abutment post.

The middle frame pipe, 15, is secured by its ends to the upper frame pipe, 11, and the lower frame pipe, 12, by means of a pair of clamp plates, 69, (like the clamp plates, 27 and 58) which bear against the sides of the adjacent horizontal pipe and the sides of the adjacent end of the middle pipe. Bolts, 70, extend through the holes, 71, of said plates at each side of the horizontal pipe, while a bolt, 72, extends through the middle eyes, 73, of said plates and the pipe, 15. A tension brace, 74, is shown extending from the upper inner corner piece, H, to one of the eyes, 73, of the plates, 69, at the lower end of the pipe, 15; and a similar brace member, 75, is shown extending from one of the eyes, 73, of one of the clamp plates, 69, at the upper end of the pipe, 15, to the lower outer corner piece, H. Wire fabric, 76, may be applied in any desired manner to fill the space within the parallelogram formed by the frame pieces, 11, 12, 13, and 14.

The lower inner corner piece, H, may rest upon the stationary eye, 5, which, as above described, is supported by the hinge post, A, and supports the lower end of the pintle shaft. But the drawings show such corner piece resting upon a shiftable gate-supporting member, 77, (Figs. 2 and 3). Said supporting member surrounds the pintle shaft and has two prongs, 81, which project downward and rearward into the adjacent face of the hinge post, A. By thus projecting into said post, said prongs are held against downward movement, and they form a pivot for the bodily downward turning of said member. But said member can thus move downward only until the rear wall of the opening, in said member, bears against the rear face of the pintle shaft. This being at a point higher than the point of engagement of said prongs, it may be said that said member is pivoted at the point of engagement of said prongs and leans forward against the pintle shaft and is by said shaft held against further outward movement. Placing the weight of the gate upon said member, 77, serves merely to press said member into stronger engagement with said post and said pintle shaft. Said member may be raised or lowered for setting the gate at different elevations. When the outer end of the gate sags or there is enough snow upon the ground to impede the swinging of the gate, freedom of movement may be acquired by making upward adjustment in this manner.

In Figs. 2, 4, 5, 6, and 7, the stationary clamp member, 49, is secured to the front face of the left hand or inner upright frame pipe, 13, by means of a clamp plate, 82, (like the plates, 27, 58, and 69) applied to the back of said pipe, bolts, 83, extending through said plates, 82, and clamp member, 49. Said clamp member may be adjusted up and down on said frame pipe. And said clamp member may also be secured without the aid of the clamp plate, 82. The corner piece, H, has a horizontal slot, 84, and an upright slot, 85, extending from front to rear. The body of said clamp member, 49, is in the form of a square and has in each of its four corners and midway between said corners a hole, 86, adapted to receive bolts. On its rear face, said plate has a middle horizontal groove, 87, and a middle upright groove, 88, intersecting the groove, 87. In all of the four angles formed by said grooves and adjacent the corner apertures, 86, is a small rearward projecting lug, 89. (See Fig. 17.)

The clamp member, 49, may be moved upward so as to bring the two middle side holes, 86, opposite the horizontal slot, 84, and bring the adjacent horizontal portions of the corner piece, H, into the horizontal groove, 87, of the member, 49. Then bolts, 83, may extend through said middle side holes, 86, and the horizontal slot, 84, and through the middle lower hole, 86, and the upright slot, 85. (See Fig. 23.) And the clamp member, 49, may be applied to a horizontal or an upright frame member, like the upper frame pipe, 11, or like the inner upright frame pipe, 13, by using two clamp plates, 90, placed side by side, but relatively inverted, at the rear of said frame member and the clamp member, 49, and then extending bolts through the holes, 91 and 92, and through the corner holes, 86, of the clamp member, 49. In Fig. 24, the member, 49, is thus applied to the upper frame rail, 11.

I claim as my invention:

1. In an apparatus of the nature described, a gate proper hinged on an upright axis and having an outer upper corner piece, a resilient standard rising from said corner piece, a tension member applied to said standard, a fixed member adjacent the hinge of the gate proper and secured to said tension member, substantially as described.

2. In an apparatus of the nature described, a gate proper hinged on an upright axis and having an outer upper corner piece, a resilient, tapering, reversible standard rising from said corner piece, a tension member applied to said standard, a fixed member adjacent the hinge of the gate proper and secured to said tension member, substantially as described.

3. In an apparatus of the nature described, a gate proper hinged on an upright axis and having an outer upper corner piece, a resilient standard having at each end a plurality of holes and secured to said corner piece (such plurality of holes adapting the standard to varying attachment to said corner piece and the below-mentioned tension member, according to the degree of resiliency or strength desired), a tension member applied to said standard, a fixed member adjacent the hinge of the gate proper and secured to said tension member substantially as described.

4. In an apparatus of the nature described, a gate proper hinged on an upright axis and having an outer upper corner piece comprising a projecting eye, a standard secured to the wall of said eye, a tension member applied to said standard, a fixed member adjacent the hinge of the gate proper and secured to said tension member, substantially as described.

5. In an apparatus of the nature described, a gate proper hinged on an upright axis and having an outer upper corner piece provided with a projecting eye having a bolt hole in its wall, a standard rising from said eye, a bolt extending through said bolt hole and said standard, a tension member applied to said standard, a fixed member adjacent the hinge of the gate proper and secured to said tension member, substantially as described.

6. In an apparatus of the nature described, a gate proper hinged on an upright axis and having an outer upper corner piece provided with a projecting eye, a standard and a latch tongue secured to said eye, a tension member applied to said standard, a fixed member adjacent the hinge of the gate proper and secured to said tension member, substantially as described.

7. In an apparatus of the nature described, the combination of a gate proper hinged on an upright axis, a gate arm, an upright shaft for said arm, and clamping members engaging said shaft, one of said members having two journals resting in bearings on the gate proper on a substantially horizontal axis, substantially as described.

8. In an apparatus of the nature described, the combination of a gate proper hinged on an upright axis, a gate arm mechanism comprising a gate arm, an upright shaft for said arm, clamping members engaging said shaft, one of said members having two journals resting in bearings on the gate proper on a substantially horizontal axis, latch mechanism at the free end of the gate, and a latch tension member in operative relation with said latch mechanism and said gate arm mechanism, substantially as described.

9. In an apparatus of the nature described, the combination of a gate proper hinged on an upright axis, a gate arm, an upright shaft for said arm, a clamp member secured to the gate proper, and having two bearings on a substantially horizontal axis and two members engaging the gate arm shaft and one of which has journals resting in said bearings, substantially as described.

10. In an apparatus of the nature described, the combination of a gate proper hinged on an upright axis, a latch mechanism, a gate arm located at the inner end of the gate and arranged for limited movement independently of the gate, means operatively connecting said arm and said latch mechanism, tension members operatively connected with said gate arm and extending away from the gate, a relatively stationary member at the side of the gate hinge opposite the arc through which the gate swings, and resilient tension mechanism connecting said stationary member and the outer end of the gate, substantially as described.

11. In a apparatus of the nature described, the combination of a gate proper hinged on an upright axis, a clamp member having at its rear a horizontal groove and an upright groove and having bolt holes, a clamp plate hinged to said clamp member, an upright gate arm shaft secured to said clamp plate, and a gate arm on said shaft, substantially as described.

12. In an apparatus of the nature described, the combination of a gate proper hinged on an upright axis, a clamp member attached to said gate and having diverging bearings, a clamp plate having journals and lugs adjacent said journals at one side of the latter, an upright gate arm shaft secured to said plate, and a gate arm on said shaft, substantially as described.

13. In an apparatus of the nature described, the combination of a gate proper hinged on an upright axis, a movable tilting lever support near the gate, a tilting lever, tension members in operative relation with said lever and said gate and means connecting said lever to said support for universal and bodily movement of said lever, substantially as described.

In testimony whereof I have signed my name, in presence of two witnesses, this 4th day of March, in the year one thousand nine hundred and ten.

TERELIUS A. HILL.

Witnesses:
CYRUS KEHR,
WM. MEYERHOFF.